United States Patent
Ozawa

[19]

[11] Patent Number: 5,946,992
[45] Date of Patent: Sep. 7, 1999

[54] CUTTING-OFF METHOD OF AN AUTOMATIC LATHE AND AN AUTOMATIC LATHE

[75] Inventor: Satoru Ozawa, Shizuoka, Japan

[73] Assignee: Star Micronics Co., Ltd., Shizouka, Japan

[21] Appl. No.: 09/095,422

[22] Filed: Jun. 11, 1998

[30] Foreign Application Priority Data

Jun. 12, 1997 [JP] Japan ..................... 9-170971

[51] Int. Cl.⁶ ........................................... B23B 1/00
[52] U.S. Cl. .................... 82/48; 82/118; 82/121; 82/162
[58] Field of Search .................... 82/48, 47, 46, 82/118, 120, 121, 123, 133, 157, 162, 170

[56] References Cited

U.S. PATENT DOCUMENTS

| 2,377,384 | 6/1945 | Slovak | 82/47 |
| 3,978,745 | 9/1976 | Okamoto | 82/118 |
| 4,180,894 | 1/1980 | Link | 82/117 X |
| 4,413,539 | 11/1983 | Ishizuka et al. | 82/121 X |
| 5,168,609 | 12/1992 | Kojima et al. | 82/162 X |

FOREIGN PATENT DOCUMENTS 2566570 10/1996 Japan.

*Primary Examiner*—Andrea L. Pitts
*Assistant Examiner*—Henry W. H. Tsai
*Attorney, Agent, or Firm*—Sughrue, Mion, Zinn Macpeak & Seas, PLLC

[57] ABSTRACT

A cutting-off method of an automatic lathe, comprising steps of applying a front working to a bar material by a front working tool with the bar material chucked by a main spindle rotatably supported by a headstock and with a top end of the bar material supported by a guide bush, applying a cutting-off by a cut-off tool after completion of the front working with the top end of the bar material chucked and rotatively driven by a sub spindle rotatably supported by a rear headstock, and simultaneously releasing the bar material chucked by the main spindle so that the headstock may rearwardly move to a working start position to be ready for the next working.

12 Claims, 14 Drawing Sheets

5,946,992

CUTTING-OFF METHOD OF AN AUTOMATIC LATHE AND AN AUTOMATIC LATHE

BACKGROUND OF THE INVENTION

1. Field of the Invention

The present invention relates to a cutting-off method of an automatic lathe, and to an automatic lathe, in which a headstock and a rear headstock are movably provided, and more particularly, in which, during a cutting-off, the headstock may rearwardly move to a working start position by releasing the chucking of a bar material by a main spindle, without requiring any complicated structure, thereby shortening the idle time to eventually improve the workability.

2. Description of the Related Art

One example of a headstock-moving type of automatic lathe is designed as follows. There is a main spindle which holds and rotates a bar material, and the main spindle is rotatably secured to a headstock. The headstock is designed to be movable in an axial direction of the bar material (a Z-axial direction). A guide bush is provided in the front of the headstock, and a tool post having a cutting tool is provided in the vicinity of the guide bush, so that the tool post may move in an X-axial direction perpendicular to the Z-axial direction.

Accordingly, the bar material is held by the main spindle as well as by the guide bush which supports an end of the bar material. The bar material is then worked by the cutting tool mounted on the tool post through movements, for example, of the headstock in the Z-axial direction and of the tool post in the X-axial direction.

When a predetermined cutting operation is completed, the bar material is cut off. The main spindle holds and rotatably drives the bar material during the cutting-off, and when the cutting-off is completed, the main spindle releases the bar material, and the headstock rearwardly moves away from the guide bush. When the headstock returns to a working start position, the bar material is held again by the main spindle to allow to proceed to the next cutting operation. Thus the operation cycle is repeated.

The thus described headstock-moving type of automatic lathe may be provided with a rear headstock. A sub spindle of the rear headstock holds the workpiece (made from the bar material), which has been cut off after completion of the front working, so that the working on the rear of the workpiece may separately be carried out by a cutting tool mounted on the tool post.

The cutting-off of the headstock-moving type of automatic lathe having a rear headstock is described as follows. When the cutting operation on the front side of the bar material is finished, the top end of the bar material is held by a sub spindle of the rear headstock. In such a state, the bar material is held at both sides, namely by the main spindle and by the sub spindle. At that time, both the main spindle and the sub spindle rotatively drives the bar material so that a cut-off tool mounted on the tool post may cut the bar material through movement of the tool post.

After completion of the cutting-off, the headstock releases the bar material and rearwardly moves away from the guide bush until reaching the working start position. Then the bar material is held again by the main spindle to proceed to the next front working. On the other hand, the workpiece cut off the bar material is held by the sub spindle to allow a rear working on the rear of the workpiece.

In the thus described structure, the headstock will have to keep holding of the bar material in the vicinity of the guide bush until completion of the cutting-off, and after completion of the cutting-off, the headstock is eventually allowed to return to the working start position. However, in such a structure, it requires much time to start the next front working, thereby the idle time is lengthened, which results in poor workability.

To overcome the above problem, there is provided an automatic lathe disclosed in a Japanese Patent No. 2566570, of which structure is discussed with reference to FIG. 14 as a prior art.

FIG. 14 is a sectional view showing a partial structure of an automatic lathe according to the Japanese Patent No. 2566570. There is a headstock 201 which rotatably holds a main spindle 202. A tool post 203 is provided in the front of the headstock 201. A guide bush housing 205 is fixed on the tool post 203. A bearing 207 is provided on the inner periphery of the guide bush housing 205, so that a pivot 209 is rotatably supported via the bearing 207. A timing pulley 211 is secured to the pivot 209 so that a timing belt 213 is wound between the timing pulley 211 and another unillustrated timing pulley.

Accordingly, when the other unillustrated timing pulley is rotatively driven by an unillustrated driving motor, the timing belt 213 and the timing pulley 211 are driven, thereby the pivot 209 is rotatively driven.

There is a guide bush 215 inside the pivot 209, and an adjust screw 217 is engaged with and connected to the rear end of the guide bush 215. Further, there are levers 221 mounted on the rear end of the pivot 209 via pins 219. One end of the lever 221 is in contact with a flange 217a of the adjust screw 217, and the other end thereof is protrusively provided toward the outer periphery of the pivot 209.

There is a bobbin 223 provided at the rear end of the pivot 209 to be in slidable contact with the outer periphery of the pivot 209. The other end of the lever 221 as above discussed is in contact with a taper surface 223a provided on an inner periphery of the bobbin 223.

The bobbin 223 is sandwiched and supported by an opening/shutting lever 225 swingably mounted on the tool post 203. The opening/shutting lever 225 is further connected to a piston rod 229 of a hydraulic cylinder mechanism 227 mounted on the tool post 203.

According to above structure, for example, when the piston rod 229 of the hydraulic cylinder mechanism 227 is driven in the protrusive direction, the opening/shutting lever 225 rotates in the counterclockwise direction, thereby the bobbin 223 moves toward the right hand of FIG. 14. Thus the adjust screw 217 and the guide bush 215 move toward the left hand of FIG. 14 via the levers 221. Accordingly, there is formed a proper size of space between the guide bush 215 and a bar material 231.

To the contrary, when the piston rod 229 of the hydraulic cylinder mechanism 227 is driven in the withdrawal direction, the opening/shutting lever 225 rotates in the clockwise direction, thereby the bobbin 223 moves toward the left hand of FIG. 14. Thus the adjust screw 217 and the guide bush 215 move toward the right hand of FIG. 14 via the levers 221. Accordingly, the guide bush 215 holds the bar material 231.

In the thus mentioned automatic lathe, while the guide bush holds and drives the bar material 231 to be rotated, a cut-off tool 233 as shown by virtual (chain double-dashed) line may cut the bar material 231 off. At that time, since the headstock 201 may release the chucking of the bar material 231, the headstock 201 eventually returns to the working start position, thereby the idle time can be shortened, which results in improvement in workability.

However, the above discussed prior art has the following problem.

Firstly, as shown in FIG. 14, the guide bush mechanism including the guide bush 215 as well as the peripheral parts thereof requires the complicated and large-sized structure, due to the rotative driving mechanism provided in the guide bush mechanism, and due to requirement of a clamp mechanism of the guide bush 215 to serve as a collet chuck.

Secondly, during the cutting-off, the automatic lathe in the prior art cannot perform the two-dimensional working such as to form an arc or a taper, since the guide bush 215 holding the bar material 231 cannot move in the Z-axial direction (namely, the lateral directions of FIG. 14).

Further, as illustrated in FIG. 14, the size of space between the guide bush 215 and the bar material 231 is varied during the working cycle. That is, although the space is provided between the guide bush 215 and the bar material 231 during an ordinary working, when the cutting-off is carried out, the bar material 231 is held by the guide bush 215 without space. However, according to the thus described structure, it is difficult to control the size of the space of the guide bush 215, and there will be a case, for example, that the proper size of space cannot be formed during the ordinary working, which may result in poor accuracy of working.

SUMMARY OF THE INVENTION

It is an object of the present invention to provide a cutting-off method of an automatic lathe, and an automatic lathe, in which a headstock is movable to a working start position during a cutting-off without requiring complicated structure or large-sized device, thereby shortening the idle time to eventually improve the workability.

To achieve the object mentioned above, according to the present invention, there is provided a cutting-off method of an automatic lathe comprising steps of applying a front working to a bar material by a front working tool with the bar material chucked by a main spindle rotatably supported by a headstock and a top end of the bar material supported by a guide bush, after completion of the front working, cutting off the bar material by a cut-off tool with the top end of the bar material chucked and rotatably driven by a sub spindle rotatably supported by a rear headstock, and simultaneously with the cutting-off, releasing the chucking of the bar material by the main spindle so that the headstock may rearwardly move to a working start position to be ready for the next working.

Preferably, the bar material may be chucked again by the main spindle after the headstock returns to the working start position to be ready for the next working.

Preferably, during the cutting-off by the cut-off tool, whether or not the main spindle of the returned headstock chucks the bar material may be determined when the cut-off tool reaches a predetermined intermediate position, and after confirming that the main spindle chucks the bar material, the cutting-off maybe continued.

Preferably, the angle of the cut-off tool may be set so that the bar material on the side of the main spindle of the headstock may firstly be cut.

Preferably, a two-dimensional working may be applied to the bar material during the cutting-off, in combination of control of movement of the rear headstock in an axial direction of the main spindle, with control of movement of the cut-off tool in a direction perpendicular to the axial direction of the main spindle.

Preferably, whether or not the main spindle of the returned headstock chucks the bar material may be determined when the cutting-off reaches a predetermined intermediate position, and when the main spindle is determined to chuck the bar material, the cutting-off may be continued by synchronizing a movement in an axial direction of the rear headstock with a movement in an axial direction of the headstock.

Further, there is provided an automatic lathe comprising, a headstock which rotatably supports a main spindle and is movable in an axial direction of the main spindle (a $Z_1$ axial direction), a rear headstock provided opposite to the headstock and which rotatably supports a sub spindle and is movable in an axial direction of the sub spindle (a $Z_2$ axial direction) and in which the sub spindle rotates synchronized with the main spindle, a guide bush provided between the main spindle and the sub spindle, tool posts provided by sides of the guide bush and movable in respective directions (an $X_1$ and an $X_2$ axial directions) perpendicular to the $Z_1$ axial direction and each having at least a cut-off tool, and a control means or controller. The control means or controller applies a front working to the bar material chucked by the main spindle, and cuts off the bar material by the cut-off tool after completion of the front working. The cutting-off comprises, chucking the bar material by the sub spindle and releasing the chucking by the main spindle so that the headstock may be retracted to a working start position, determining whether or not the main spindle of the retracted headstock chucks again the bar material when the cutting-off reaches a predetermined intermediate position, and continuing the cutting-off if it is determined that the bar material is chucked by the main spindle.

Preferably, the control means or controller may control a two-dimensional working during the cutting-off, in combination of control of movement of the rear headstock in the $Z_2$ axial direction, with control of movement of the tool post in the $X_1$ axial or $X_2$ axial direction.

Preferably, the control means or controller may determine whether or not the main spindle of the returned headstock chucks the bar material when the cutting-off reaches a predetermined intermediate position, thereby the control means or controller may continue the cutting-off by synchronizing a movement of the rear headstock in the $Z_2$ axial direction with a movement of the headstock in the $Z_1$ axial direction when the main spindle is determined to chuck the bar material.

With this structure, when the cutting-off is applied to the bar material for which the front working has been completed, the bar material is held and rotatively driven by the rear headstock, thereby the cutting-off is applied to the bar material. On the other hand, during the cutting-off, the headstock releases the bar material and rearwardly moves to the working start position to be ready for the next working. Therefore the next working can be started immediately after completion of the cutting-off, thereby the idle time may be shortened without requiring any complicated structure, which results in improvement in workability.

Further, when the headstock is returned, if the bar material is held again, the next working can be started sooner.

Further, if the angle of the cut-off tool is set so that the bar material on the main spindle side may firstly be cut, the sequential cutting-off to remove the "nib" can be carried out without suspension.

Further, the two-dimensional working can be carried out during the cutting-off in combination of the control of movement of the sub spindle in the axial direction with the control of movement of the cut-off tool in the direction perpendicular to the axial direction of the main spindle. Accordingly, for example, the cutting-off can be carried out together with a rear working.

BRIEF DESCRIPTION OF THE DRAWINGS

The invention will be described below in detail with reference to the accompanying drawings, in which.

DETAILED DESCRIPTION OF THE INVENTION

First Embodiment

Figure 1:
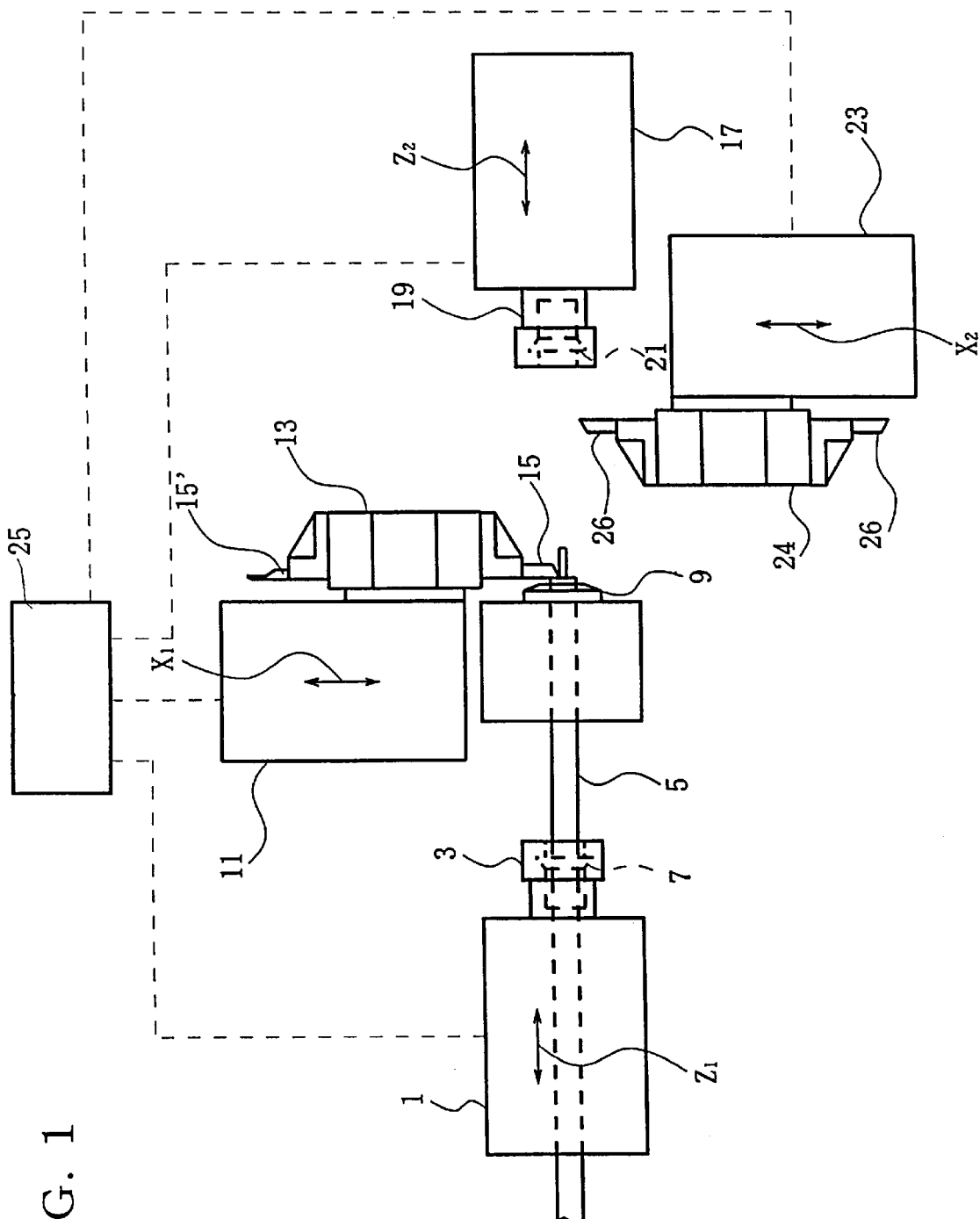
FIG. 1 is a plan view showing an overall structure of an automatic lathe according to a first embodiment of the present invention.

A first embodiment of the present invention will now be described with reference to FIGS. 1 through 10. FIG. 1 is a plan view showing an overall structure of an automatic lathe according to a first embodiment of the present invention. There is a headstock 1 to be movable in a spindle-axis direction (in the direction of $Z_1$ axis) by a servo motor and a ball screw-nut mechanism (not shown). The headstock 1 rotatably holds a main spindle 3, which has a collet chuck 7 to hold a bar material 5.

There is a guide bush 9 in the front (on the right hand of FIG. 1) of the headstock 1. A first tool post 11 is provided by the side of the guide bush 9 (above the guide bush 9 in FIG. 1). The first tool post 11 is movable in an $X_1$ axial direction perpendicular to the $Z_1$ axial direction by a servo motor and a ball screw-nut mechanism (not shown). The first tool post 11 loads a turret 13 on which a plurality of tools, such as a front working tool 15 and a cut-off tool 15', etc., are mounted to be selected by indexing.

There is a rear headstock 17 opposite to the headstock 1 as seen from the guide bush 9. The rear headstock 17 is movable in a $Z_2$ axial direction parallel to the $Z_1$ axial direction by a servo motor and a ball screw-nut mechanism (not shown). The rear headstock 17 rotatably supports a sub spindle 19, which has a collet chuck 21 to hold the bar material 5.

There is a second tool post 23 provided by the side of the rear headstock 17. The second tool post 23 is movable in an $X_2$ axial direction perpendicular to the $Z_2$ axial direction by a servo motor and a ball screw-nut mechanism (not shown). The second tool post 23 also loads a turret 24 on which a plurality of rear working tools 26 are mounted.

Figure 6:
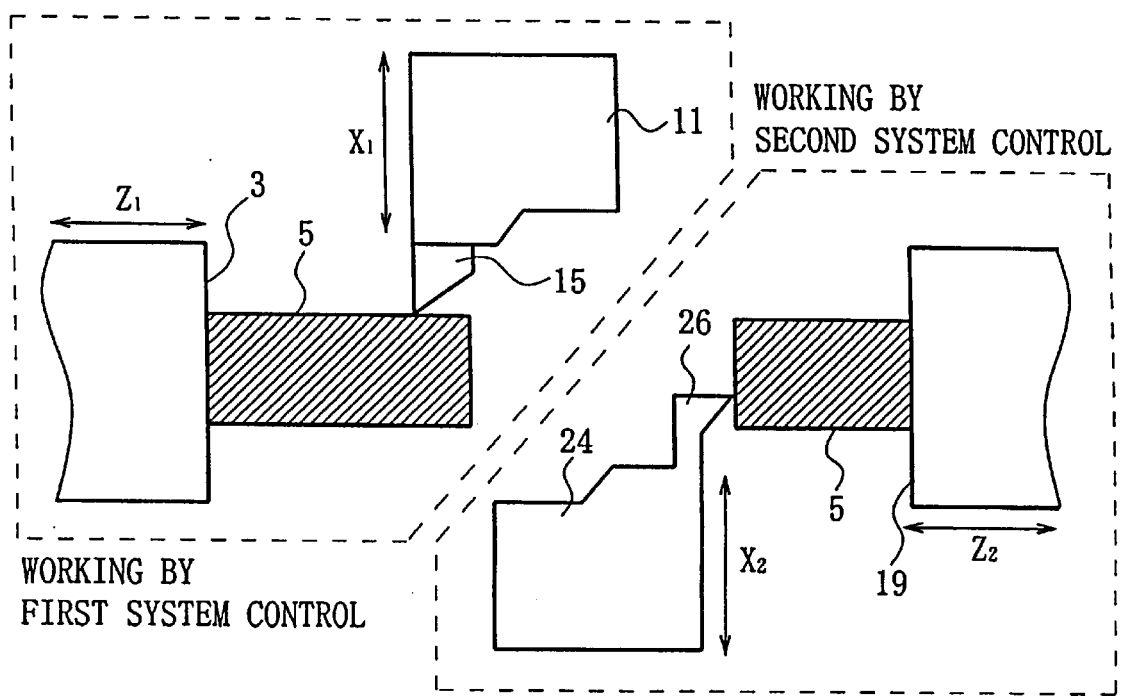
FIG. 6 is a view showing control systems according to the first embodiment of the present invention.
Figure 7:
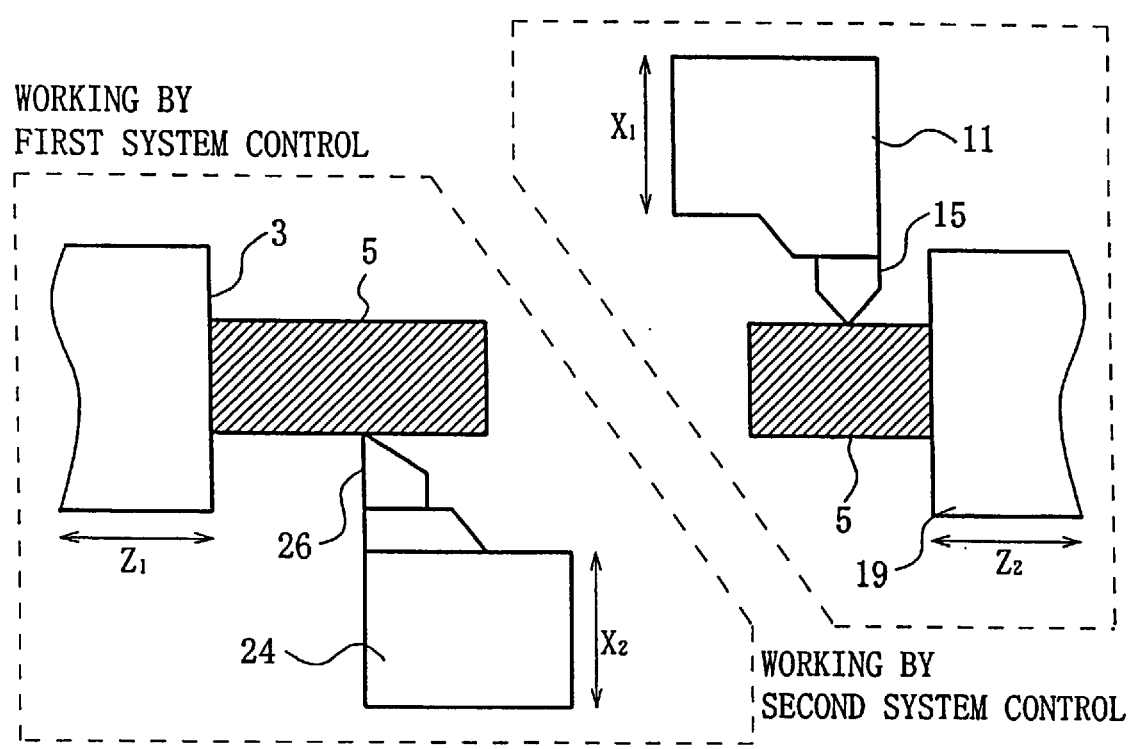
FIG. 7 is a view showing control systems according to the first embodiment of the present invention.

The automatic lathe according to the present invention is controlled by two systems of program command in regard to the $X_1$ axis, the $Z_1$ axis, the $X_2$ axis and the $Z_2$ axis, as illustrated in FIG. 6. In an ordinary operation, the program command of a first system controls movement in the $X_1$ axial and the $Z_1$ axial directions to carry out the front working, and the program command of a second system controls movement in the $X_2$ axial and the $Z_2$ axial directions to carry out the rear working. It is also possible to exchange the movement commands of any desirous axes between the two systems. For example, as illustrated in FIG. 7, command for the $X_1$ axis and that for the $X_2$ axis can be exchanged to each other.

In addition, reference numeral 25 of FIG. 1 shows a control means or controller.

The operation of the automatic lathe according to the present embodiment will now be described as follows.

Firstly, as illustrated in FIG. 1, the bar material 5 is held by the collet chuck 7 of the main spindle 3, and the top end of the bar material 5 is further supported by the guide bush 9. The turret 13 is rotated to index a predetermined front working tool 15. After that, for example, the program command of the first system controls movement of the first tool post 11 in the $X_1$ axial direction and also controls movement of the headstock 1 in the $Z_1$ axial direction, so that the predetermined working ("front working") is applied to the bar material 5 by the front working tool 15.

Figure 2:
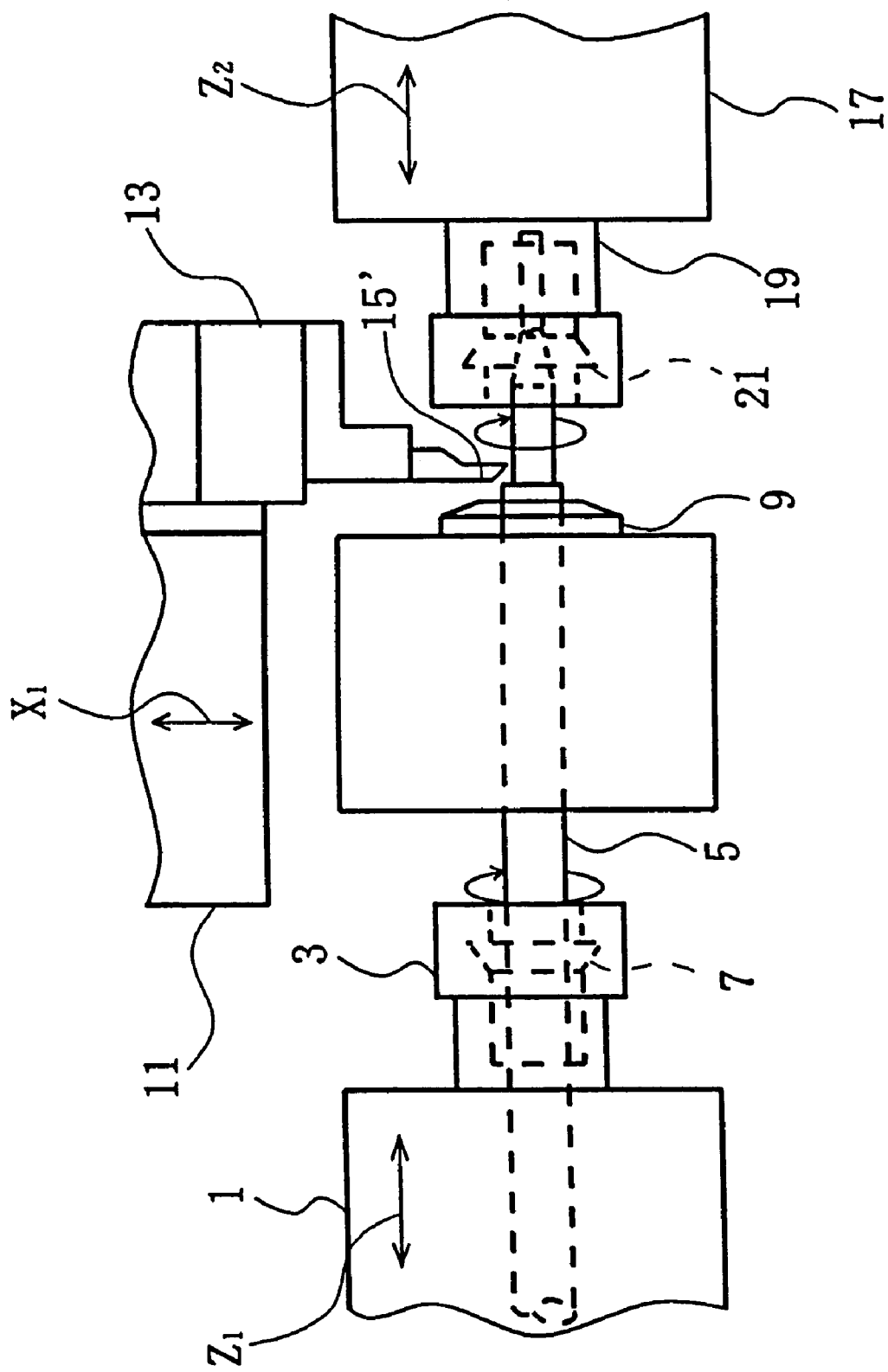
FIG. 2 is a partial plan view showing a function of the automatic lathe during a cutting-off according to the first embodiment of the present invention.

After completion of the front working as above described, there follows a cutting-off. As illustrated in FIG. 2, the program command of the second system controls movement of the rear headstock 17 in the $Z_2$ axial direction, so that the collet chuck 21 of the sub spindle 19 holds the top end (where a front working is done) of the bar material 5 protruding from the guide bush 9. Then the turret 13 is rotated to index the predetermined tool (the cut-off tool 15'). Such a state is as illustrated in FIG. 2.

Figure 3:
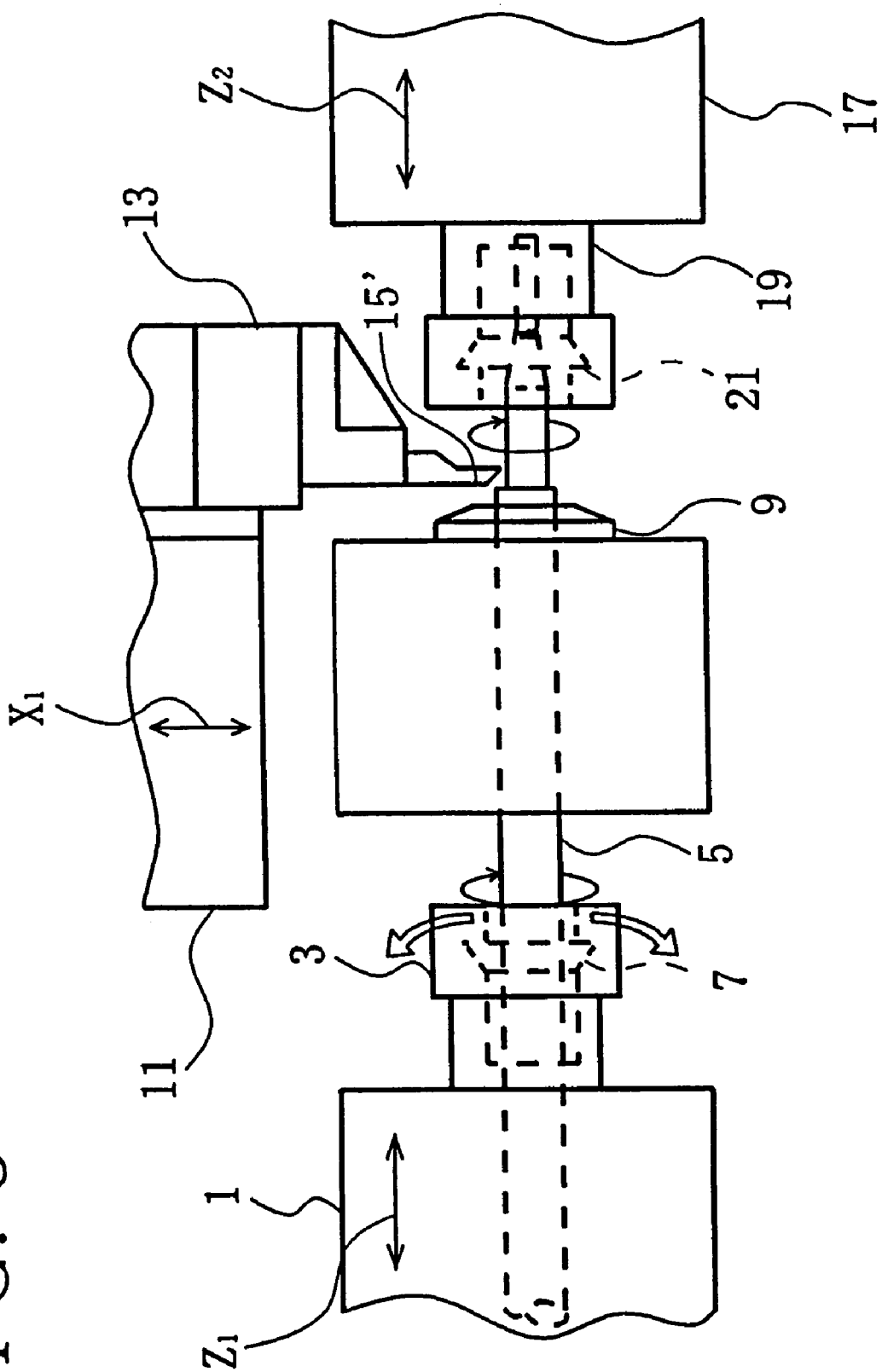
FIG. 3 is a partial plan view showing a function of the automatic lathe during the cutting-off according to the first embodiment of the present invention.

FIG. 3 shows the next step, in which the movement control of the $X_1$ axis is switched from the first system control to the second system control. Thus the program command of the second system controls movement of the first tool post 11 in the $X_1$ axial direction, thereby the cutting-off is applied to the bar material 5 by the cut-off tool 15'. Simultaneously, the program command of the first system releases the held state of the bar material 5 by the collet chuck 7 of the main spindle 3.

When the collet chuck 7 of the main spindle 3 releases the bar material 5, since the bar material 5 is still held and rotatively driven by the collet chuck 21 of the sub spindle 19, no trouble will occur during the cutting-off.

Figure 4:
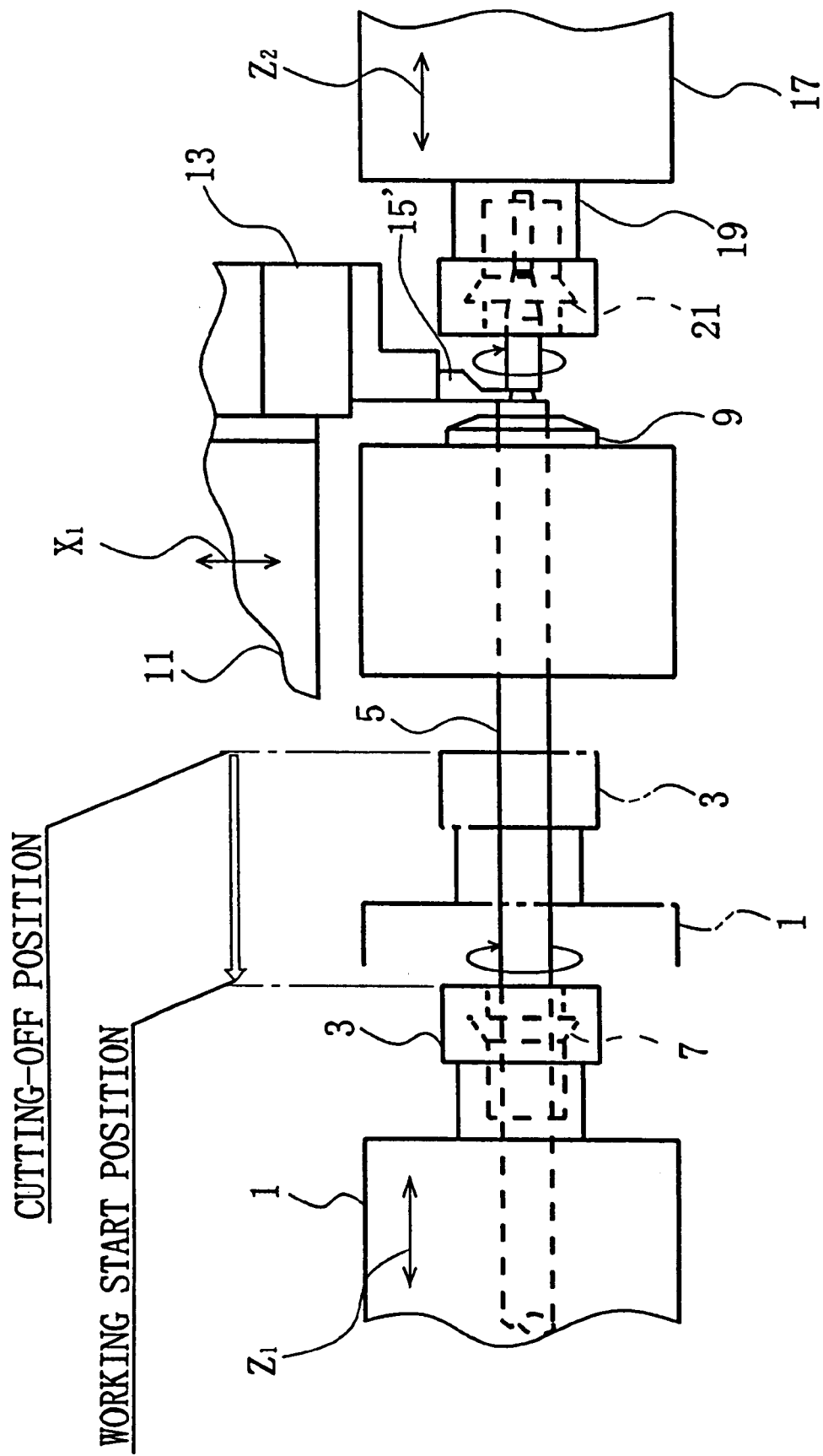
FIG. 4 is a partial plan view showing a function of the automatic lathe during the cutting-off according to the first embodiment of the present invention.
Figure 5:
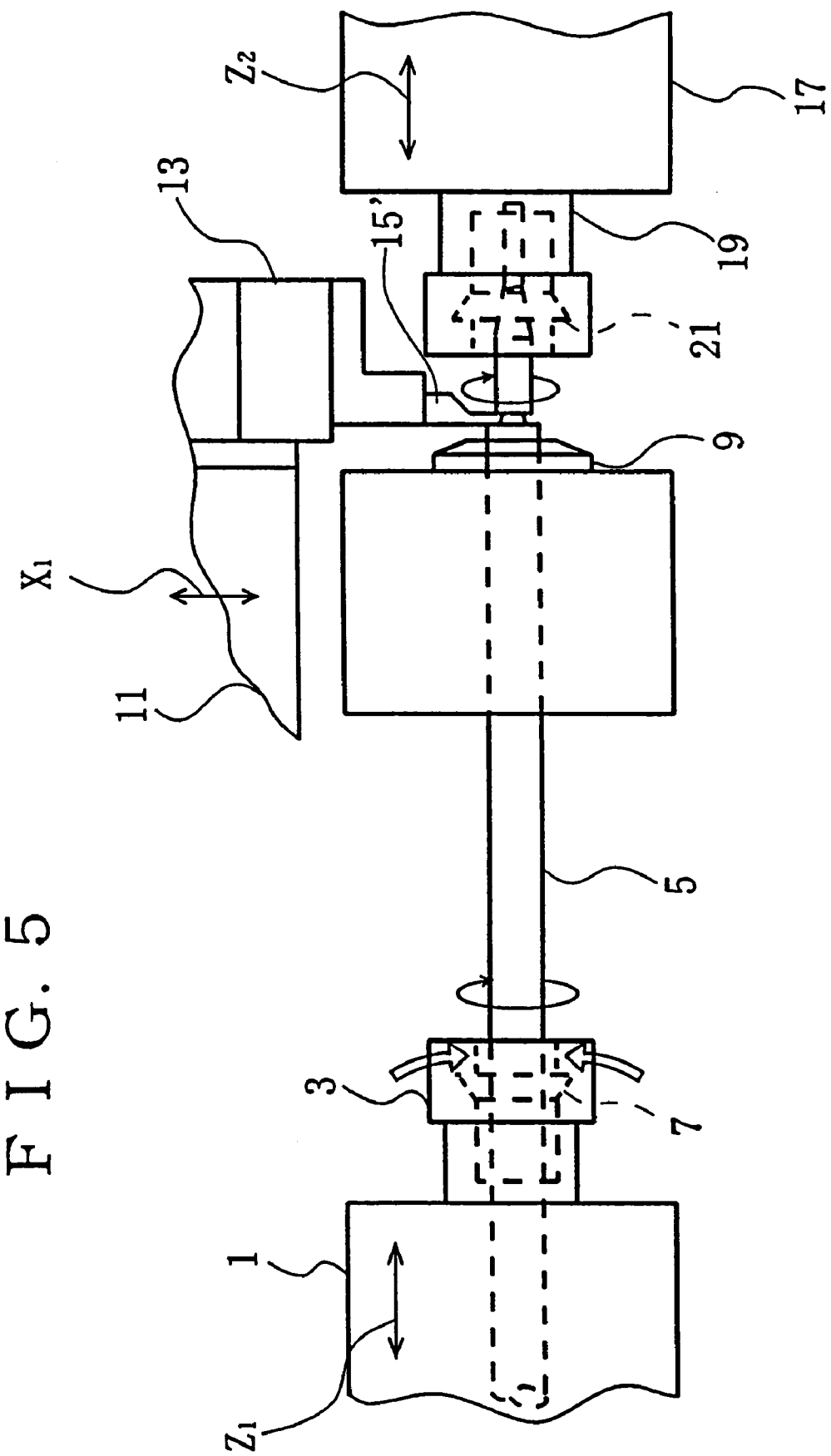
FIG. 5 is a partial plan view showing a function of the automatic lathe during the cutting-off according to the first embodiment of the present invention.

After that, as shown in FIG. 4, the headstock 1 moves in the $Z_1$ axial direction until reaching a working start position. When the headstock 1 returns to the working start position, the collet chuck 7 of the main spindle 3 holds the bar material 5 again, as illustrated in FIG. 5.

The main spindle 3 and the sub spindle 19 are electrically synchronized with each other to be rotatively driven, therefore the second-time holding of the bar material 5 by the collet chuck 7 will cause no trouble.

When the cutting-off is completed, the headstock 1 has been returned to the working start position with the collet chuck 7 of the main spindle 3 holding the bar material 5. Accordingly, the control of movement in the $X_1$ axial direction is switched from the second system control to the first system control, and the front working is immediately started by the first system control. On the other hand, the program command of the second system controls movement of the rear headstock 17 to rearwardly move in the $Z_2$ axial direction to be ready for the next rear working by the second tool post 23.

Figure 8:
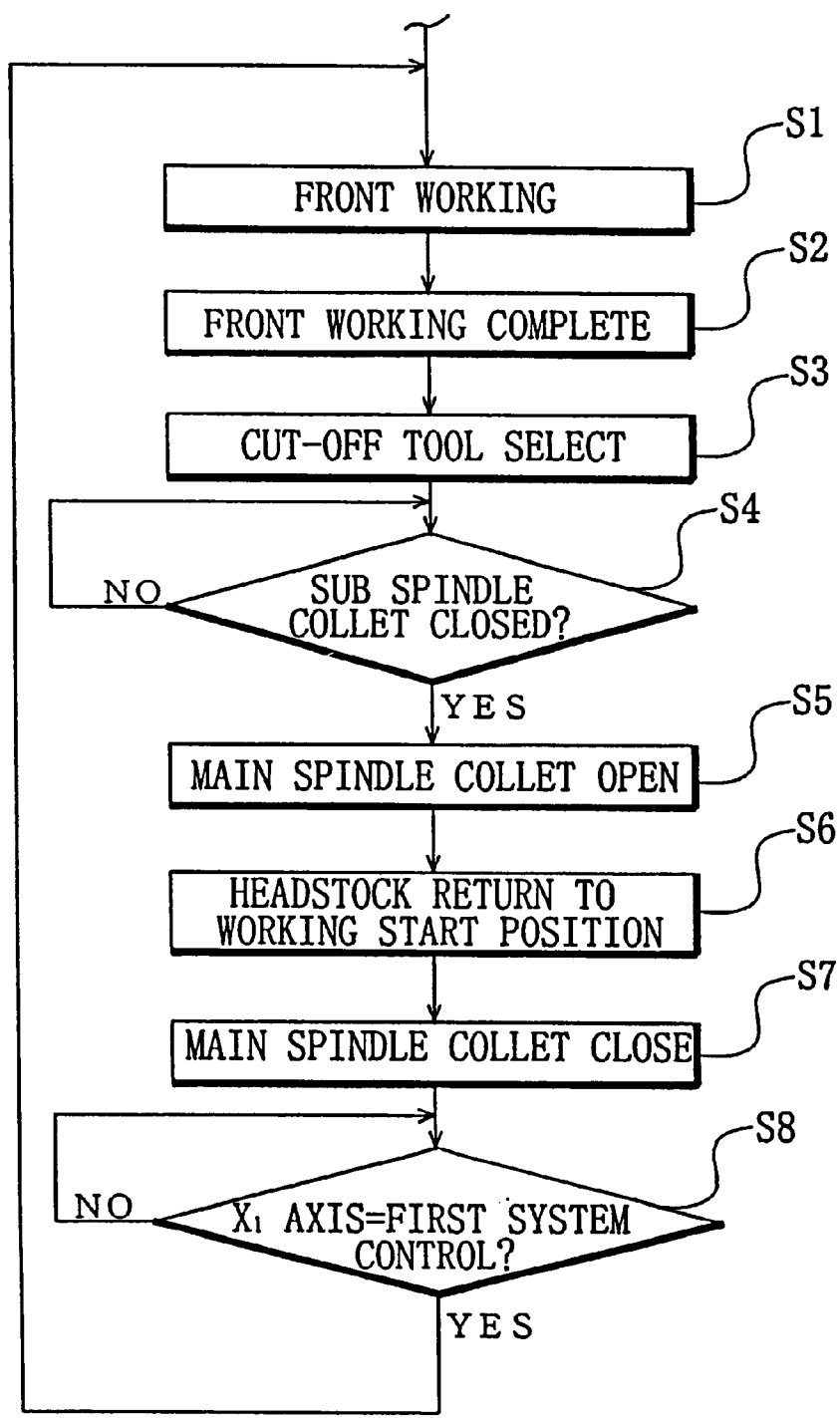
FIG. 8 is a flowchart of a first system control according to the first embodiment of the present invention.

The above described operation will be described with reference to flowcharts of FIGS. 8 and 9. FIG. 8 shows a first system program, of which control is started by the front working at step S1. The front working is completed at step S2, then the control proceeds to step S3 to select the cut-off tool 15'. After that, whether or not the collet chuck 21 of the sub spindle 17 holds the bar material 5 is determined at step S4, and if held, the control proceeds to step S5 to open the collet chuck 7 of the main spindle 3. Then the headstock 1 rearwardly moves until reaching the working start position at step S6, and after that, the collet chuck 7 of the main spindle 3 is closed to hold the bar material 5 again (step S7). Then the control proceeds to step S8 to determine whether or not the $X_1$ axis is under the first system control.

Figure 9:
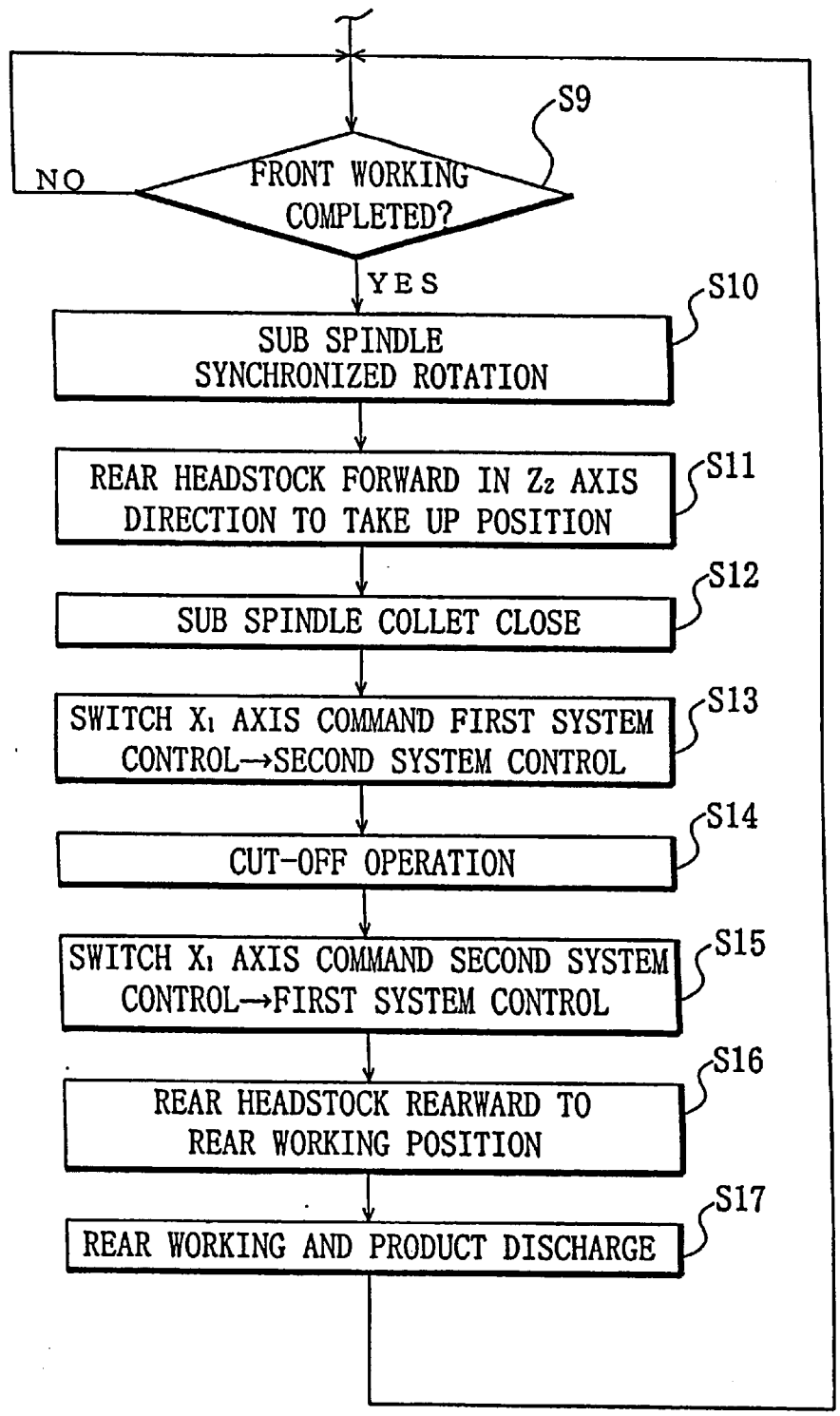
FIG. 9 is a flowchart of a second system control according to the first embodiment of the present invention.

FIG. 9 shows a second system program, which firstly determines at step S9 whether or not the front working is completed. If completed, the control proceeds to step S10 to rotate the sub spindle 21 synchronized with the main spindle 3. The completion of the front working is informed by an output signal from the first system control. Then the rear headstock 17 forwardly moves in the $Z_2$ axial direction toward a take-up position at which the top end of the bar material 5 is held by the sub spindle 21. After that, the control proceeds to step S12 to close the collet chuck 21 of the sub spindle 19, thereby the bar material 5 is held. The held state of the bar material 5 by the sub spindle 19 is informed by an output signal to the first system control.

Then the command of movement in the $X_1$ axial direction, which has been under the first system control, is switched to that under the second system control at step S13, and the cutting-off is carried out at step S14. After that, the command of movement in the $X_1$ axial direction, currently under the second system control, is switched again to that of the first system control at step S15. This is also informed by an output signal to the first system control. Then the rear headstock 17 rearwardly moves to the rear working position at step S16. After that, the movement of the second tool post 23 is controlled to carry out the rear working, then the product is discharged (step S17).

The cutting-off will be additionally described. The cutting-off is carried out against the bar material 5 by forwarding the first tool post 11 in the $X_1$ axial direction. At that time, according to the angle of edge of the cut-off tool 15', there remains a conical projection so-called "nib", at the center of the end surface of the bar material 5 on the side of the main spindle 3, or at the center of the end surface of the bar material 5 held by the sub spindle 19. In ordinary operations, the angle of the edge of the cut-off tool 15' is determined so that the "nib" may be formed on the bar material 5 at the side of the main spindle 3. The remaining "nib" is then cut to be removed by further forwarding the cut-off tool 15'.

In order to further advance the cut-off tool 15' to remove the remaining projection, the bar material 5 of the main spindle side needs be continuously provided with rotational driving force. Therefore, while the bar material 5 of the main spindle side is still subject to the driving torque of the sub spindle 19, the headstock 1 must be in time returned to the working start position to again hold the bar material 5. In some cases, however, the cutting-off may be finished earlier before the headstock 1 is returned in position, failing to continuously provide driving torque to the bar material 5. Therefore, in such a case, the control suspends the cutting-off until the collet chuck 7 of the main spindle 3 of the returned headstock 1 holds the bar material 5 again, and after the collet chuck 7 of the main spindle 3 holds the bar material 5 again, the control continues the rest of the operation to cut the "nib".

Figure 10:
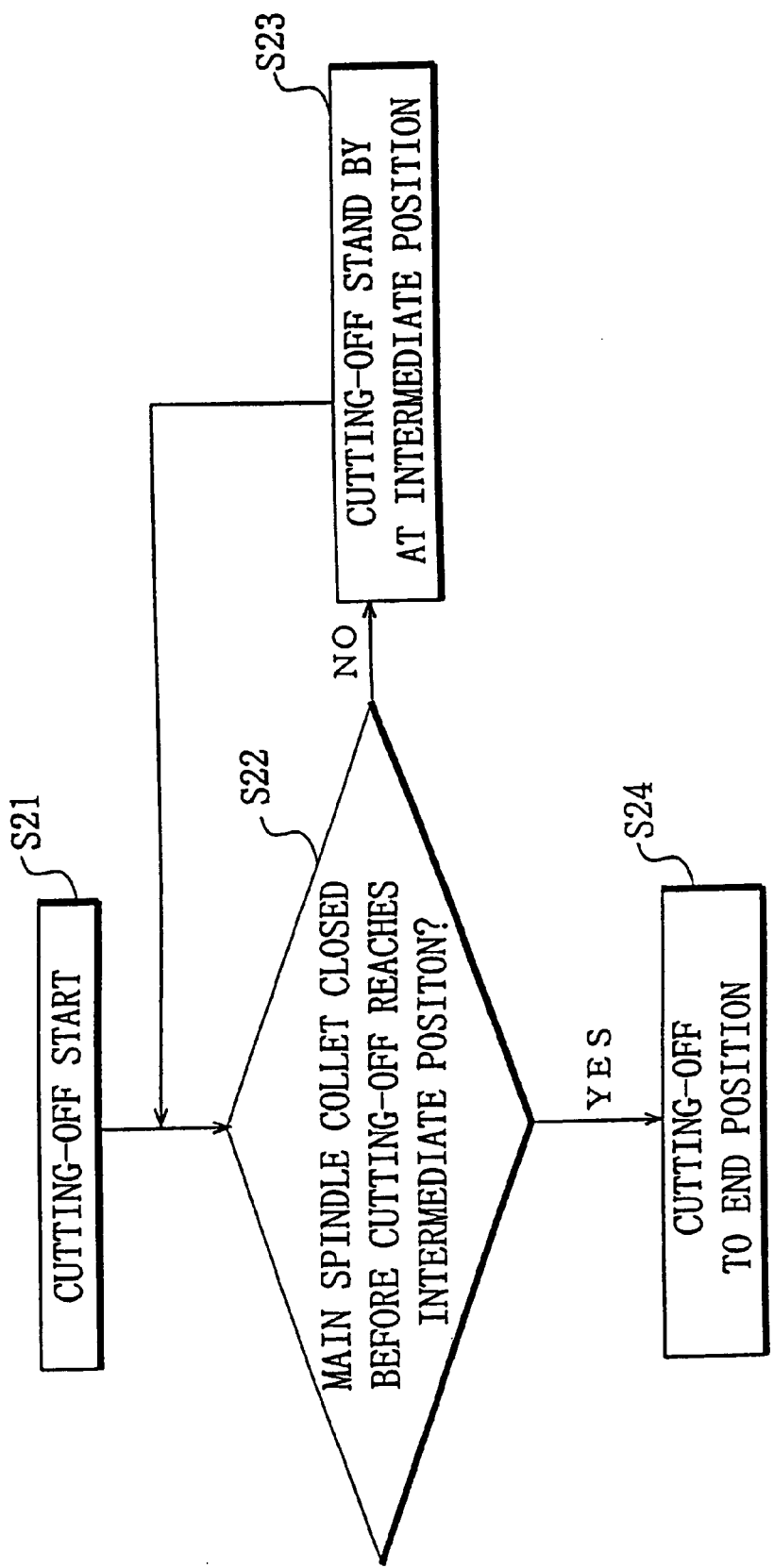
FIG. 10 is a flowchart of a control according to the first embodiment of the present invention.

The above function will be described with reference to a flowchart of FIG. 10. The cutting-off is started at step S21. At step S22, whether or not the collet chuck 7 of the main spindle 3 is closed, before the cutting-off reaches a predetermined position (intermediate position), is determined. Namely, whether or not the bar material 5 is held by the collet chuck 7 of the main spindle 3, before the cutting-off reaches the intermediate position, is determined at step S22. The predetermined position (intermediate position) referred hereto means the position set within the range, in which the sub spindle 19 may rotatively drive the bar material 5 in a state that the bar material 5 is not held by the collet chuck 7 of the main spindle 3. When the bar material 5 is not held by the collet chuck 7 of the returned main spindle 3, the control proceeds to step S23 to suspend the cutting-off at the predetermined position in a stand-by state. On the other hands when the bar material 5 is held by the collet chuck 7 of the returned main spindle 3, the control proceeds to step S24 to continue the cutting-of f until reaching an end position. The end position referred hereto means the position at which the "nib" is removed from the end surface of the bar material 5 held by the main spindle 3 or by the sub spindle 19.

When the state is clearly seen that the cutting-off has not been reached the predetermined position before the bar material 5 is held by the collet chuck 7 of the main spindle 3 of the returned headstock 1, the above described control is not required.

The angle of the cut-off tool 15' may be set so that the "nib" may remain on the end surface of the bar material 5 held by the sub spindle 19. In this case, since the bar material 5 is held by the collet chuck 21 of the sub spindle 19 and continuously subject to driving torque until the cutting-off is fully completed, the above described suspension is not required.

The present embodiment has the following merits.

Firstly, the idle time may remarkably be shortened, which results in improvement in workability, without requiring such a complicated structure as that of the prior art. This is because, while the bar material 5 is held and rotatively driven by the collet chuck 21 of the sub spindle 19, the collet chuck 7 of the main spindle 3 releases the bar material 5, thereby the headstock 1 rearwardly moves to the working start position at which the bar material 5 may be held again. That is, although the headstock 1 rearwardly moves after completion of the cutting-off in the prior art, in the present invention, the headstock 1 rearwardly moves during the cutting-off.

In addition, the large-sizing or complicated structure of the guide bush mechanism in the prior art is no longer required, thereby the desirous effect may be obtained in quite a simple structure.

Second Embodiment

Figure 11:
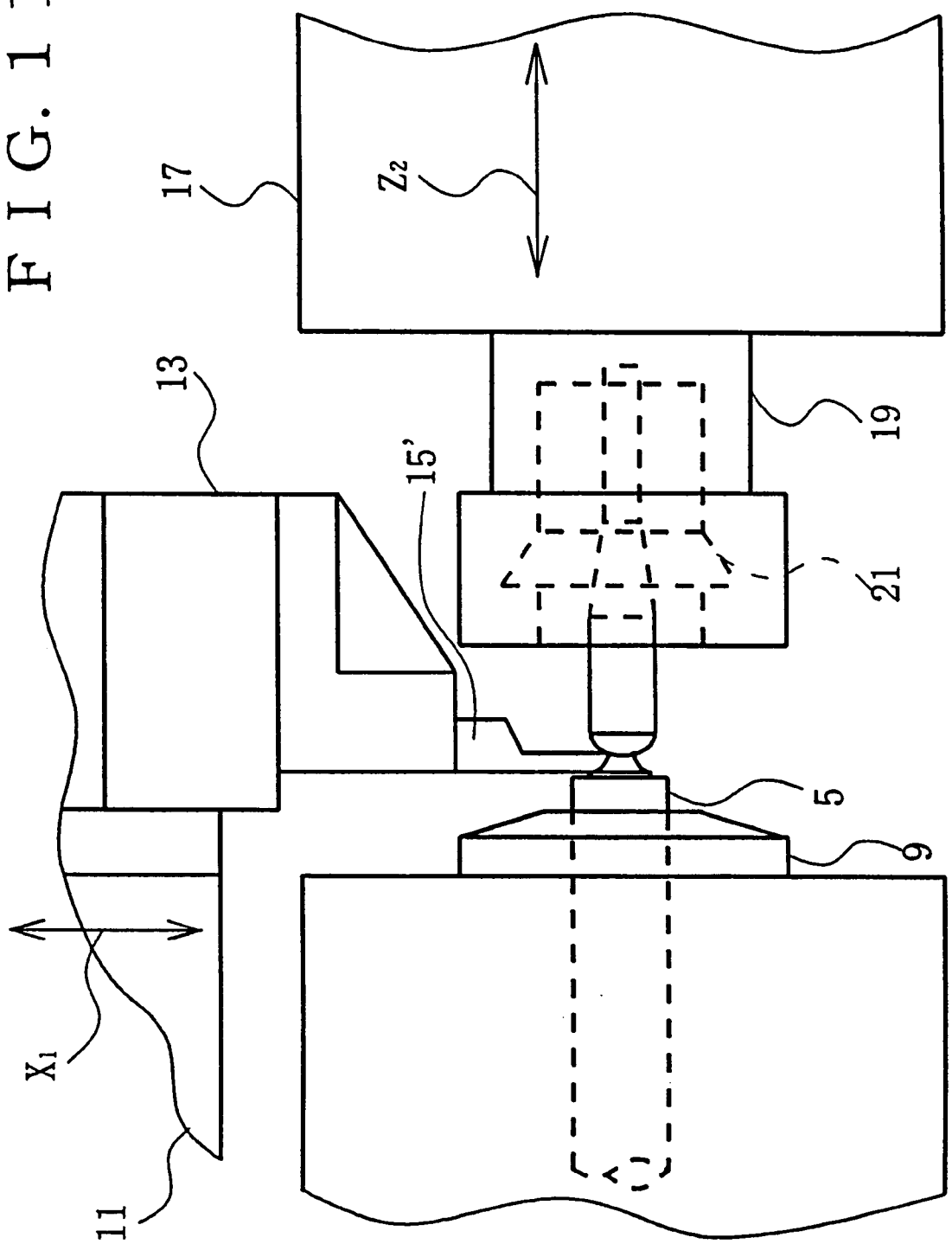
FIG. 11 is a partial plan view showing a function of an automatic lathe during a cutting-off according to a second embodiment of the present invention.
Figure 12:
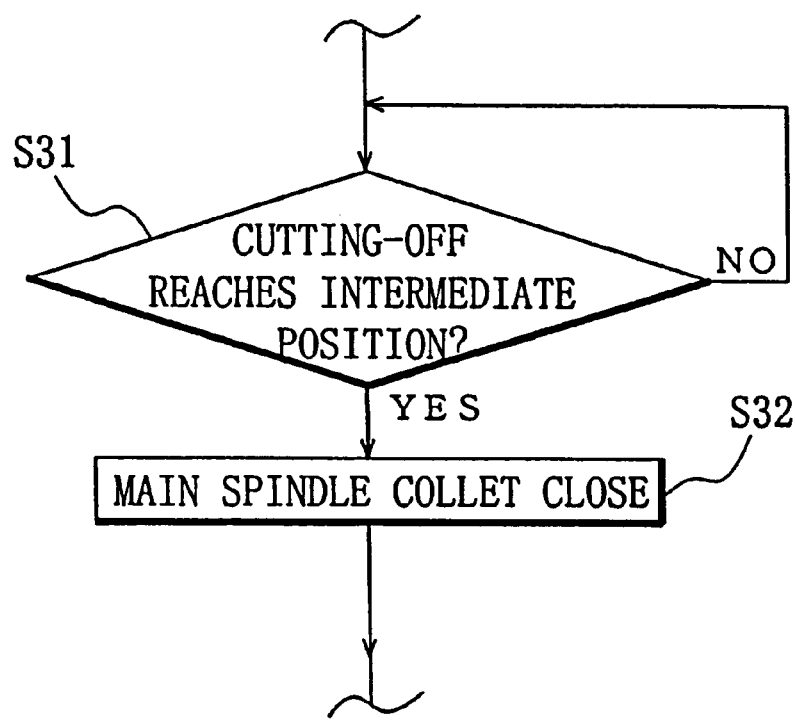
FIG. 12 is a flowchart of a control according to the second embodiment of the present invention.

A second embodiment of the present invention will be described with reference to FIGS. 11 and 12. Although the first embodiment refers to the cutting-off in which the cut-off tool 15' cuts straight the bar material 5, the second embodiment refers to the cutting-off accompanied with two-dimensional working as illustrated in FIG. 11.

During the cutting-off according to the second embodiment, similar to the first embodiment, the headstock 1 rearwardly moves in the $Z_1$ axial direction with the collect chuck 7 open under the program command of the first system. However, as the bar material 5 is held by the collet chuck 21 of the sub spindle 19, the control in the $X_1$ axial direction is switched from the first system control to the second system control. Thus the cutting-off as illustrated in FIG. 11 is carried out by the program command of the second system, which controls both movement of the first tool post 11 in the $X_1$ axial direction and movement of the rear headstock 17 in the $Z_2$ axial direction.

Figure 13:
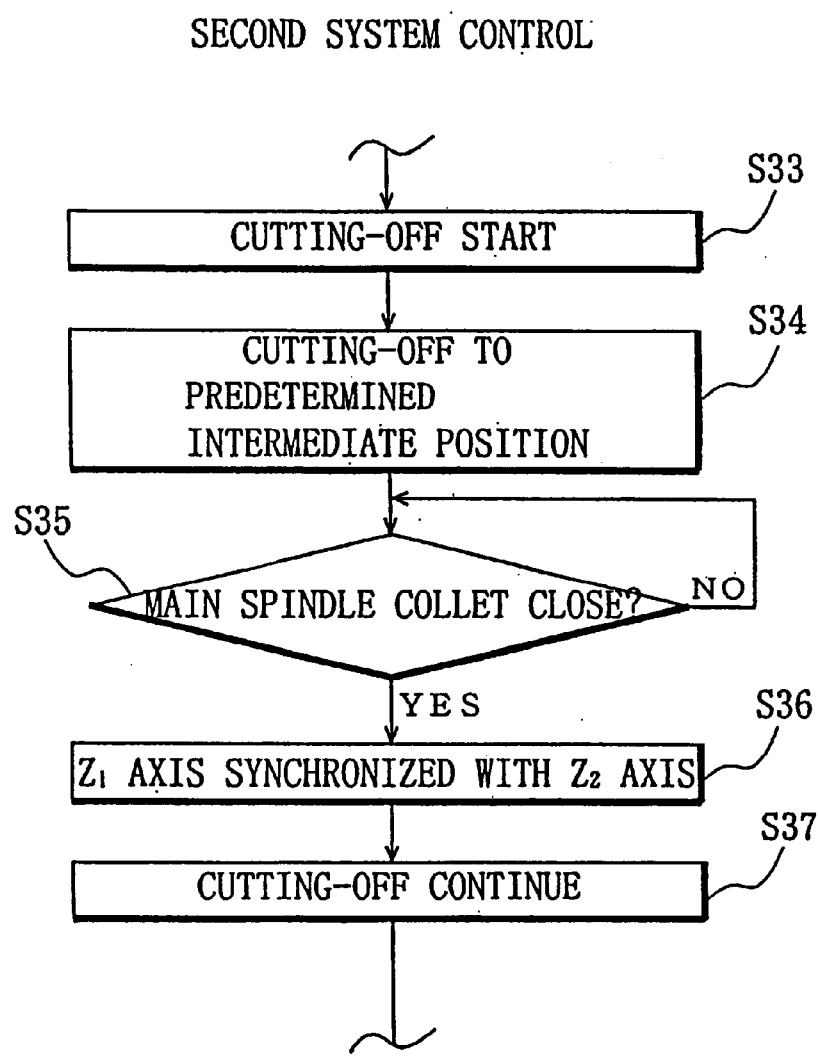
FIG. 13 is a flowchart of a control according to the second embodiment of the present invention.
Figure 14:
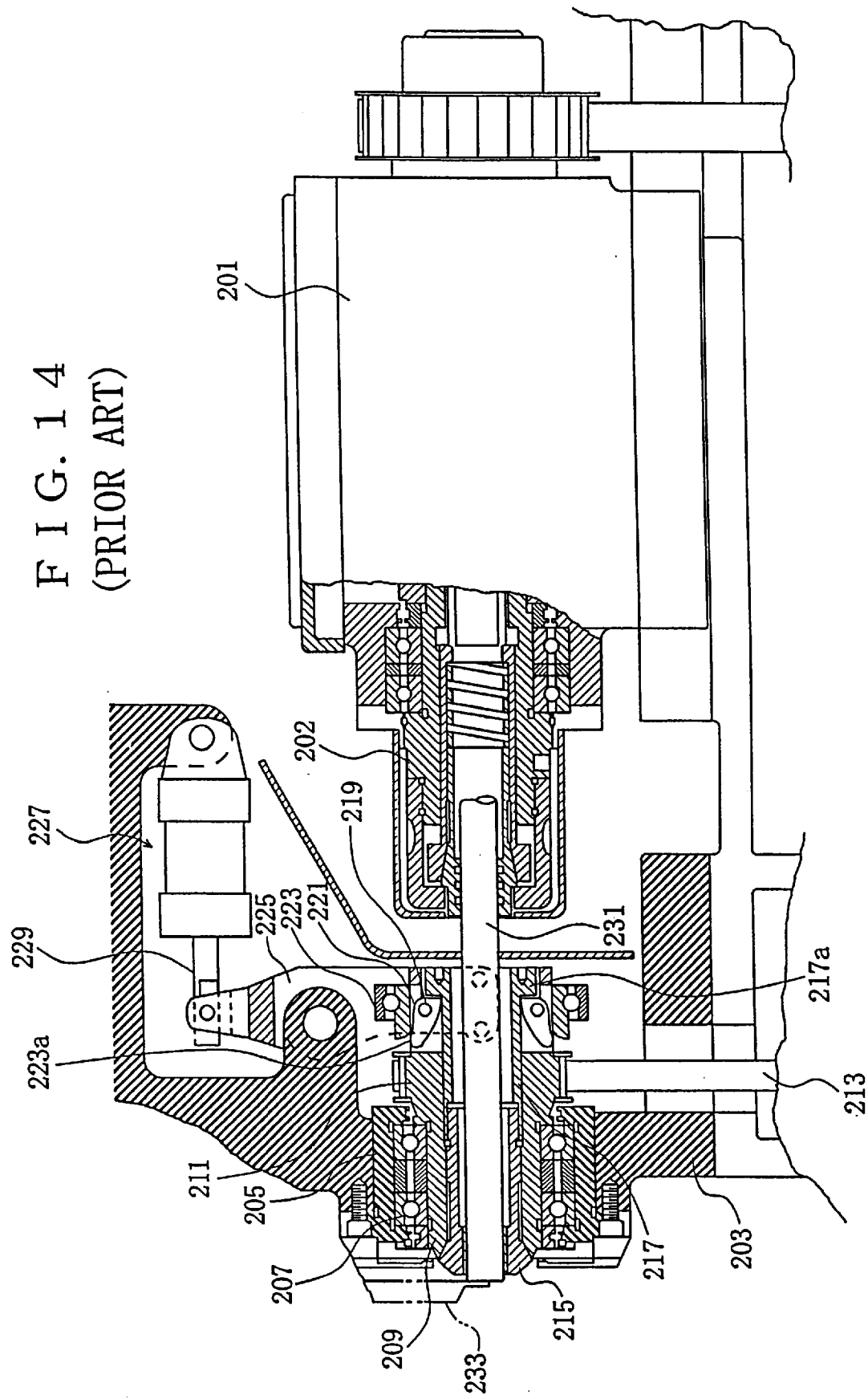
FIG. 14 is a sectional view of a partial structure of an automatic lathe according to a prior art.

The above function will be described with reference to flowcharts of FIGS. 12 and 13. Firstly, as for the first system program, whether or not the cutting-off reaches the predetermined position (intermediate position), is determined at step S31. If yes, the control proceeds to step S32 to hold the bar material 5 by the collet chuck 7 of the main spindle 3.

Secondly, as for the second system program, the cutting-off is started at step S33 until reaching the predetermined position (intermediate position) at step S34. The control proceeds to step S35 to determine whether or not the bar material 5 is held by the collet chuck 7 of the main spindle 3. If held, the control proceeds to step S36 at which the rotation of the $Z_1$ axis is synchronized with that of the $Z_2$ axis, thereby the cutting-off is continued at step S37.

The present invention is not limited to the first and second embodiments as described above.

Firstly, it is clear that the structure of the automatic lathe as shown above is merely an example thereof, and the present invention can equally be applied to other structures of the automatic lathe.

Secondly, although the above embodiments refer to the cutting-off by the cut-off tool mounted on the first tool post, it is also clear that the cut-off tool may be mounted on the second tool post to carry out the cutting-off. In this case, the switching of the control systems in regard to the $X_1$ axis is not required.

What is claimed is:

1. A cutting-off method of an automatic lathe comprising:
   applying a front working to a bar material by a front working tool by moving a headstock in an axial direction from a working start position toward said front working tool with said bar material chucked by a main spindle rotatably supported by said headstock and a top end of said bar material supported by a guide bush;
   after completion of said front working, cutting off said bar material by a cut-off tool with said top end of said bar material chucked and rotatably driven by a sub spindle rotatably supported by a rear headstock; and
   simultaneously with said cutting-off, releasing the chucking of said bar material by said main spindle so that said headstock may rearwardly move to the working start position to be ready for another front working.
2. The cutting-off method of an automatic lathe as claimed in claim 1, further comprising a step of chucking said bar material again by said main spindle after said headstock returns to said working start position to be ready for another front working.
3. The cutting-off method of an automatic lathe as claimed in claim 2, further comprising steps of:
   determining whether or not said main spindle of said returned headstock chucks said bar material when said cutting-off reaches a predetermined intermediate position; and
   continuing said cutting-off after confirming that said main spindle chucks said bar material.
4. The cutting-off method of an automatic lathe as claimed in claim 1, further comprising a step of setting an angle of said cut-off tool so that said bar material on a side of said main spindle of said headstock may firstly be cut.
5. The cutting-off method of an automatic lathe as claimed in claim 1, further comprising a step of applying a two-dimensional working to said bar material during said cutting-off, in combination of control of movement of said rear headstock in an axial direction of said main spindle, with control of movement of said cut-off tool in a direction perpendicular to said axial direction of said main spindle.
6. The cutting-off method of an automatic lathe as claimed in claim 5, further comprising steps of:
   determining whether or not said main spindle of said returned headstock chucks said bar material when said cutting-off reaches a predetermined intermediate position; and
   continuing said cutting-off by synchronizing a movement in an axial direction of said rear headstock with a movement in an axial direction of said headstock when said main spindle is determined to chuck said bar material.
7. An automatic lathe comprising:
   a headstock which rotatably supports a main spindle and is movable in an axial direction of said main spindle;
   a rear headstock, provided opposite to said headstock, which rotatably supports a sub spindle and is movable in an axial direction of said sub spindle wherein said sub spindle rotates synchronized with said main spindle;
   a guide bush provided between said main spindle and said sub spindle;
   at least one tool post provided at the side of said guide bush and movable relative to said headstock, said at least one tool post having both a cut-off tool and a front working tool; and
   a control means for:
   applying a front working to a bar material chucked by said main spindle by moving said headstock in an axial direction from a working start position toward said front working tool, and
   cutting off said bar material by said cut-off tool after completion of said front working, said cutting-off comprising:
      chucking said bar material by said sub spindle and releasing said chucking by said main spindle so that said headstock may be retracted to the working start position,
      determining whether or not said main spindle of the retracted headstock chucks again said bar material when said cutting-off reaches a predetermined intermediate position, and
      continuing said cutting-off if it is determined that said bar material is chucked by said main spindle.

8. The automatic lathe as claimed in claim 7, wherein said control means controls a two-dimensional working during said cutting-off, by combining control of movement of said rear headstock in an axial direction of said sub spindle, with control of movement of said tool post having said cut-off tool in a direction perpendicular to an axial direction of said main spindle.

9. The automatic lathe as claimed in claim 8, wherein said control means determines whether or not said main spindle of said retracted headstock chucks said bar material when said cutting-off reaches a predetermined intermediate position, and said control means continues said cutting-off by synchronizing a movement of said rear headstock in an axial direction of said sub spindle with a movement of said headstock in an axial direction of said main spindle when said main spindle is determined to chuck said bar material.

10. An automatic lathe comprising:
  a headstock which rotatably supports a main spindle and is movable in an axial direction of said main spindle;
  a rear headstock provided opposite to said headstock, which rotatably supports a sub spindle and is movable in an axial direction of said sub spindle, wherein said sub spindle rotates synchronized with said main spindle;
  a guide bush provided between said main spindle and said sub spindle;
  a plurality of tool posts provided at the sides of said guide bush and movable relative to said headstock, one of said tool posts having a cut-off tool and another of said tool posts having a front working tool; and
  a control means for:
    applying a front working to a bar material chucked by said main spindle by moving said headstock in an axial direction from said working start position toward said front working tool, and
    cutting off said bar material by said cut-off tool after completion of said front working, said cutting-off comprising:
      chucking said bar material by said sub spindle and releasing said chucking by said main spindle so that said headstock may be retracted to said working start position,
      determining whether or not said main spindle of said retracted headstock chucks again said bar material when said cutting-off reaches a predetermined intermediate position, and
      continuing said cutting-off if it is determined that said bar material is chucked by said main spindle.

11. The automatic lathe as claimed in claim 10, wherein said control means controls a two-dimensional working during said cutting-off, by combining control of movement of said rear headstock in an axial direction of said sub spindle, with control of movement of said tool post having said cut-off tool in a direction perpendicular to an axial direction of said main spindle.

12. The automatic lathe as claimed in claim 11, wherein said control means determines whether or not said main spindle of said retracted headstock chucks said bar material when said cutting-off reaches a predetermined intermediate position, and said control means continues said cutting-off by synchronizing a movement of said rear headstock in an axial direction of said sub spindle with a movement of said headstock in an axial direction of said main spindle when said main spindle is determined to chuck said bar material.

* * * * *